Patented Nov. 8, 1932

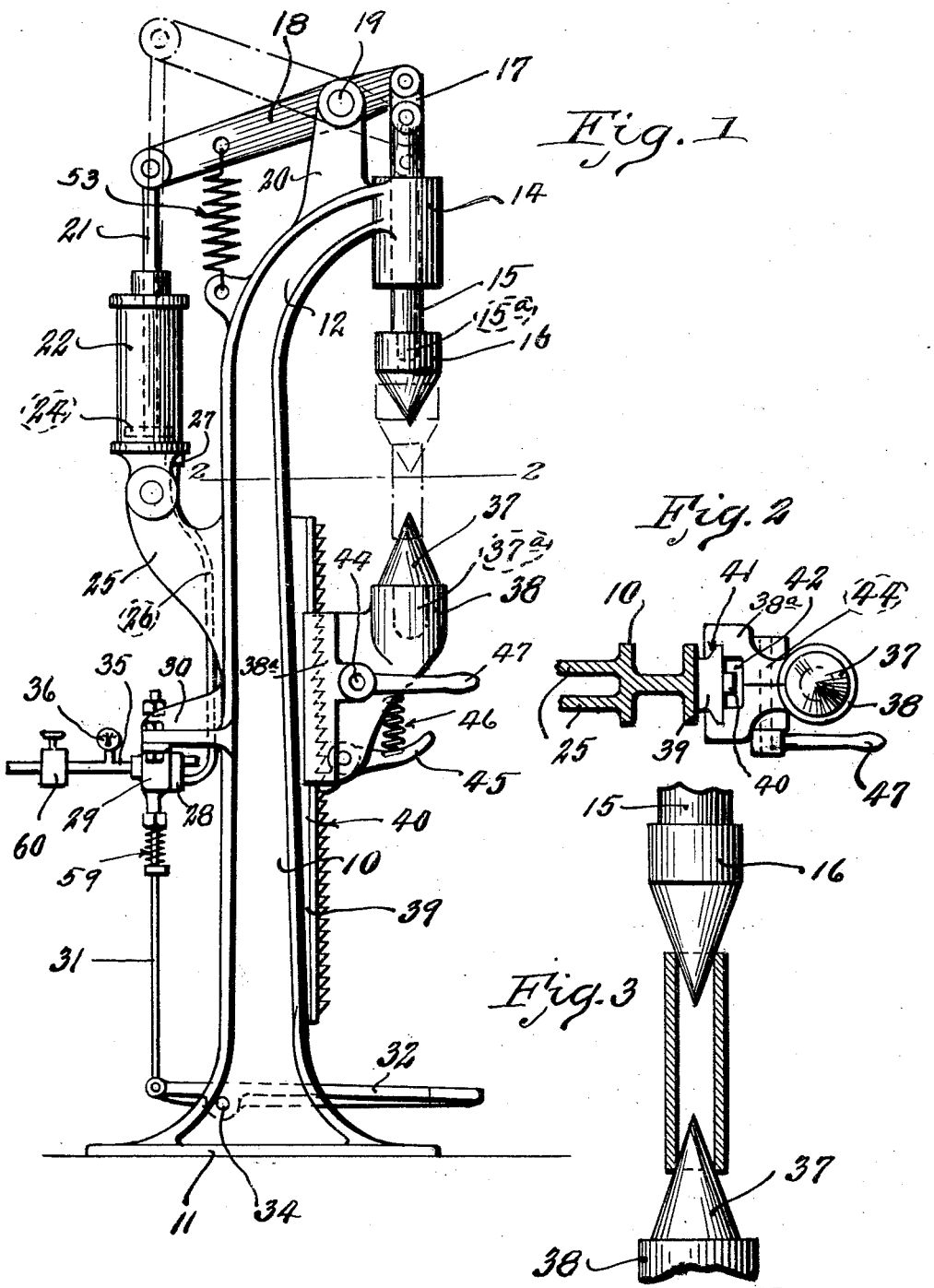

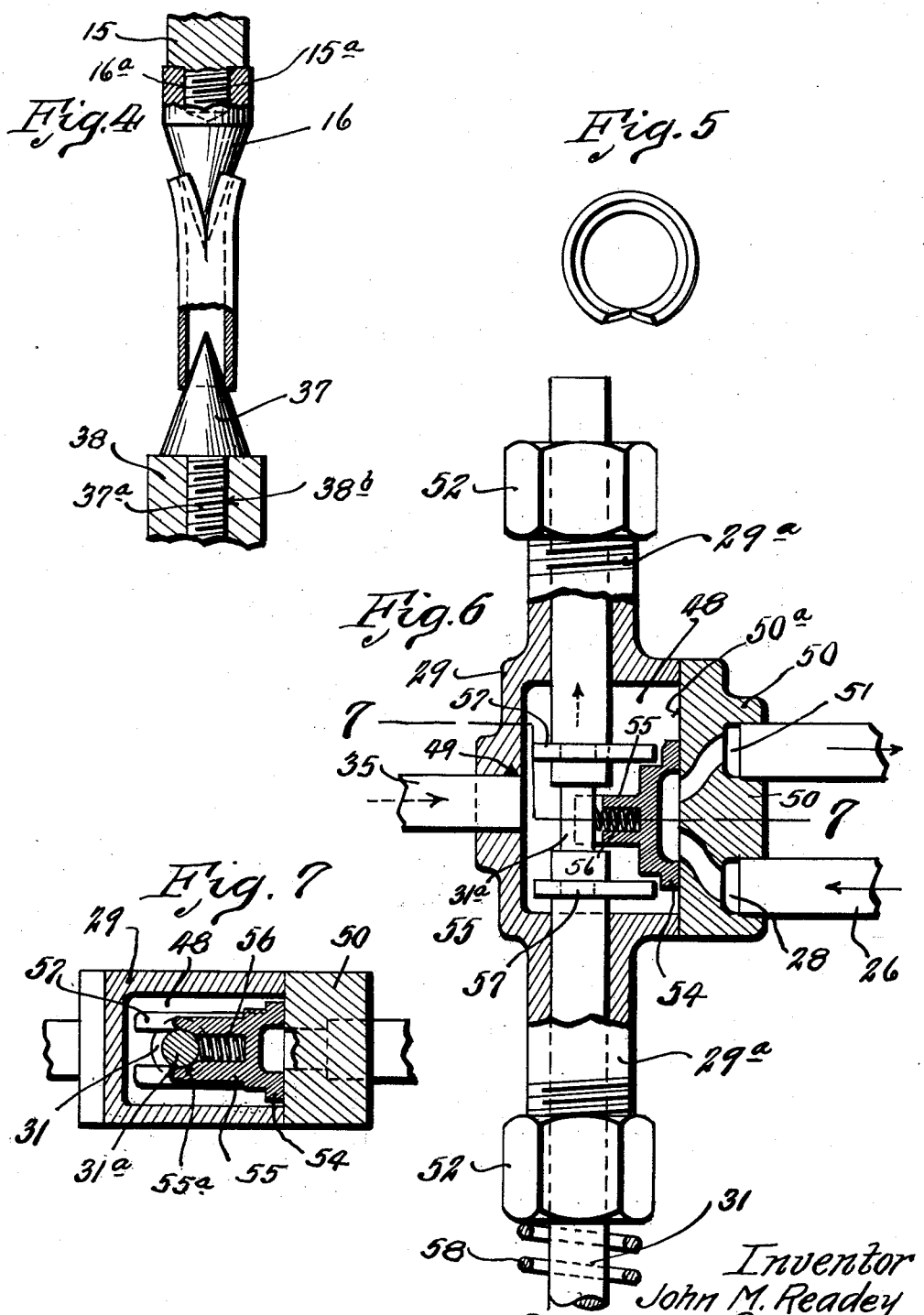

1,887,327

UNITED STATES PATENT OFFICE

JOHN M. READEY, OF ST. LOUIS, MISSOURI, ASSIGNOR TO JOHN M. READEY, INC., OF ST. LOUIS, MISSOURI, A CORPORATION OF DELAWARE

APPARATUS FOR TESTING PIPE NIPPLES

Application filed November 11, 1929. Serial No. 406,341.

This invention relates to a novel apparatus for testing pipe nipples and short lengths of pipes.

Heretofore pipe nipples and short lengths of pipe have been made from the commercial lengths as sold by the mills. These commercial pipe sections have been cut to the desired lengths and then threaded. This method was expensive, as to the regular cost of the pipe had to be added the cost of cutting it in short lengths and also the cost of threading and handling the material.

The object of the present invention is to provide a novel method of manufacturing short pipe sections from the mill ends of pipes and such pipe sections as have been rejected as imperfect at the mill. In this manner I utilize the material which heretofore has been regarded as waste and of no value and which can be obtained very cheaply. Thus I materially reduce the cost of manufacturing the pipe nipples and short lengths of pipe.

Other objects of the invention are to provide an apparatus for testing the blank nipples and short pipe sections before the threading operation in order to eliminate material which is imperfectly welded and would therefore cause breakage of the device during the threading operation.

Still other objects of the invention are to provide an apparatus for testing short sections of pipe, said apparatus including a pair of spaced cone-shaped members adapted to receive therebetween the pipe section to be threaded, one of said members being movable relatively to the other in order to subject the pipe section to a predetermined degree of pressure sufficient to cause the distortion of the imperfectly welded pipe but not sufficient to cause damage to the perfect section.

Additional objects of the invention are to provide an apparatus for testing short sections of pipe to determine the condition thereof, said apparatus comprising a pair of cone-shaped members, one of which is movable by suitable fluid pressure relatively to the other so as to subject the pipe section braced therebetween to a predetermined degree of pressure, said cone-shaped members being adjustable relatively to each other for receiving various lengths of pipe.

With these and other objects in view, my invention consists in certain novel features of construction and arrangement of parts, hereinafter more fully described and claimed, and illustrated in the accompanying drawings, in which—

Figure 1 is a side elevational view of my improved testing apparatus.

Figure 2 is a horizontal cross section taken on line 2—2 of Figure 1.

Figure 3 is an enlarged detail view showing a pipe section being tested.

Figure 4 is a similar view showing an imperfect pipe section being distorted by the apparatus.

Figure 5 is a top plan view of the distorted imperfect pipe section.

Figure 6 is a vertical cross section through the control valve.

Figure 7 is a horizontal cross section taken on line 7—7 of Figure 6.

In the manufacture of pipes, the ends of the pipe sections are gripped by a suitable apparatus of the butt welding machine. Consequently the extreme ends of each pipe section when it leaves the welding machine are left flat and the adjacent portions are imperfectly welded. After the welding operation, each pipe section is cut a suitable distance from each end in order to remove the imperfectly welded end portions. These end portions, called mill ends, heretofore have been discarded as they could not be used commercially for any purpose. By means of my novel method and my improved apparatus for testing the blank nipple sections, I am enabled to utilize these mill ends and such pipe sections as have been rejected as imperfect. As the cost of this material is very small I am enabled to manufacture nipples and such lengths of pipe very economically.

The scrap material, such as mill ends and rejects, are first cut into desired lengths ranging from an inch and a half to six inches. The extreme distorted end of each mill end and such other portions which are not welded properly are cut away and discarded.

However, there are many instances where the weld is not perfect or where the edges are butted against each other but are not welded at all, being merely rolled into shape. If an attempt is made to thread such section without preliminary testing operation, the dies of the pipe threading machine will bite into the edge causing distortion of the pipe section and breakage of the die and sometimes a more severe damage to the pipe threading machine. Consequently the cost of replacement of the dies and the cost of repairs to the machine would more than offset the saving effected by using discarded pipe material. Furthermore, even if the threading operation were successful, such nipple could not be used for commercial purposes and a rigid inspection of the finished material would be necessary.

By the use of my novel testing apparatus, the imperfect welds are readily and positively ascertained and such pipe sections discarded so that only perfect material is utilized for threading operations and the danger of breakage of dies due to imperfect welds is reduced to a minimum. Thus I am in position not only to use material heretofore discarded but provide an apparatus enabling me to reject imperfect material before the threading operation, thereby facilitating the production of the nipples and short pipes.

This testing apparatus comprises a frame 10 having the lower end provided with a base 11 and having the upper end curved upwardly and forwardly as indicated at 12 and terminating in a vertically disposed bearing 14. Slidably mounted in this bearing is a plunger 15, the lower end of which carries a downwardly presented cone-shaped member 16 and the upper end of which has pivotally connected thereto one end of a connecting link 17, the other end being pivotally connected to the forward or short arm of a lever 18. This lever is fulcrumed at 19, between a pair of upstanding lugs 20 formed integral with and projecting from the curved end 12. The long arm of lever 18 has pivotally connected thereto the upper end of a piston rod 21, the lower end of which operates in a cylinder 22 and is provided with a piston 24. This cylinder is pivotally mounted at its lower end to a lug 25 formed integral with frame 10 and disposed rearwardly thereof. The piston 14 is operated by fluid pressure, preferably compressed air, which is supplied to said cylinder 22 by a flexible conduit 26, one end of which is connected at 27 to the inlet end of the cylinder while the other end is connected to the outlet port 28 of a valve 29. This valve is fixed to a lug 30 formed integral with frame 10 and extending rearwardly therefrom, and said valve is operated by a valve stem 31, the lower end of which is pivotally connected to one end of a treadle 32. This treadle is pivotally mounted at 34 and when depressed actuates said valve so as to admit air to cylinder 22. The compressed air is supplied by a suitable reservoir (not shown) through a connection 35 which communicates with valve 29. A pressure gauge 36 is provided in said connection to indicate the operating pressure.

Cone-shaped member 16 is arranged in axial alignment with a staitonary cone-shaped member 37. This cone-shaped member 37 is disposed upwardly in opposed relation to member 16 and is fixedly mounted in a bracket 38. Bracket 38 is fixed to frame 10 and projects forwardly therefrom.

In order to permit adjustment of member 37 relatively to member 16 so as to accommodate blank nipples of various lengths, bracket 38 is adjustable in a vertical plane on frame 10. To this end said frame 10 is provided with a vertically disposed guide 39 which is dove-tailed in cross section and is provided in its face with a vertically disposed rack 40. Bracket 38 has a rear extension 38a which has a vertically disposed recess 41 dove-tailed in cross section to receive the dove-tailed guide 39. This recess is provided with a slot 42, coextensive with said recess, and arranged centrally so as to provide clearance for rack 40. Extension 38a is formed in two halves, which are adapted to be drawn together by a screw 44 so as to clamp said extension securely on the guide 39. A ratchet pawl 45 is operatively mounted on the lower end of extension 38a and is adapted to engage rack or ratchet teeth 40 for the purpose of supporting bracket 38 and member 37 in adjusted position preliminary to the locking operation by screw 44. A coiled spring 46 is utilized to hold the ratchet 45 in engagement with ratchet teeth 40 and a handle 47 is attached to one end of screw 44 for actuating the latter.

Cone-shaped member 16 has a threaded opening for receiving the threaded reduced extension 15a of plunger 15 whereby said cone-shaped member can be adjusted axially to provide fine adjustment and also to facilitate the replacement of cone-shaped member 16 if so desired. Member 37 is provided with a threaded shank 37a which is screw-seated in the threaded opening 38b of bracket 38 to provide adjustment of member 37 and to facilitate renewal thereof in case of damage thereto or where a cone of different size is to be used.

Valve 29 is provided with a chamber 48 reduce the operating expense by eliminating stoppage of threading machines and breakage of parts. The cost of the finished product is materially reduced by speeding up the production as well as reducing the cost of raw material.

I claim:

1. An apparatus for testing blank nipples comprising a pair of opposed cone members adapted to receive therebetween a blank nipple, one of said cone members being stationary and the other movable axially relatively thereto, a plunger extending axially from the base of said movable cone member, a lever pivotally connected at one end to said plunger for actuating the latter and said movable cone member, and a fluid pressure means for actuating said lever and moving said movable cone member toward said stationary cone member, thereby subjecting the nipple held between said cone members to a pressure which is calculated to cause distortion of a blank nipple having an imperfect weld and to have no effect on a blank nipple having a perfect weld.

2. An apparatus for testing blank nipples and the like comprising a pair of vertically disposed opposed cone members adapted to receive therebetween a blank nipple, one of said cone members being stationary and the other movable axially relatively thereto, a plunger extending axially from the base of said movable cone member, a lever operatively connected at one end to said plunger for actuating the latter and said movable cone member, fluid pressure means operatively associated with the other end of said lever for actuating said plunger and causing said movable cone member to move toward said stationary cone member, thereby subjecting the ends of the nipple to pressure directed radially outwardly and of sufficient degree to destroy an imperfectly welded nipple, a pipe connection for supplying fluid under pressure to said pressure means, and a valve in said pipe connection for controlling the ingress and egress of fluid to and from said fluid pressure means.

3. An apparatus for testing blank nipples and the like comprising a support, an upwardly presented cone member fixedly carried by said support, a slidable plunger mounted in said support above said fixed cone member, a downwardly presented cone member carried by the lower end of said plunger in spaced coaxial relation with said fixed cone member, said cone members being adapted to receive between them a blank nipple to be tested, a lever pivotally connected to the upper end of said plunger, and mechanism for actuating said lever, said mechanism including a fluid pressure means operable at selected fluid pressures for subjecting said blank nipple to a predetermined degree of pressure applied radially outward to the ends thereof through said cone members.

4. An apparatus for testing blank nipples and the like comprising a support, an upwardly presented cone member stationarily mounted on said support, a vertically disposed slidable plunger having bearing in said support, a downwardly presented cone member carried by said plunger in spaced coaxial relation with said fixed cone member, said cone members being adapted to receive therebetween the object to be tested, a lever fulcrumed on said support and operatively connected to said plunger, fluid pressure operated means actuating said lever in a direction to force said movable cone member toward said stationary cone member, a coiled spring anchored at one end and having the other end connected to said lever for restoring said plunger and said movable cone member to normal positions, and a valve controlling the admission and exhaust of the fluid to and from said fluid pressure operated means.

5. An apparatus for testing blank nipples and the like comprising a support, an upwardly presented stationary cone member, means for adjustably mounting said stationary cone member on said support, a slidable plunger mounted in said support above said stationary cone member, a movable cone member carried by said plunger in opposed coaxial relation with said stationary cone member, a lever fulcrumed on said support and having one end operatively connected to said plunger, fluid-pressure means operatively connected to the other end of said lever for bringing said movable cone member toward said stationary cone member under pressure, said cone members being adapted to receive therebetween the object to be tested, and valve means for controlling the admission and discharge of fluid to and from said fluid pressure means.

6. In an apparatus for testing blank nipples and the like, the combination with a pair of coaxially aligned cone members, one of which is stationary and the other movable axially relatively thereto, of a support, a plunger movably mounted in said support and carrying said movable cone member, and means arranged on said support below said movable cone member for supporting said stationary cone member, said means being adjustable on said support to vary the position of said stationary cone member coaxially relatively to said movable cone member.

7. In an apparatus for testing blank nipples and the like, the combination with a support, of a pair of opposed cone members, one of which is stationary and the other movable in axial direction, said cone members being adapted to receive therebetween the tubular object to be tested, a support, a lever with which communicates an inlet port 49 to which the connection 35 is connected. This chamber 48 is closed at one side by a removable plate 50 having outlet port 28 and an exhaust port 51.

Connection 26 leads from port 28 and establishes communication with cylinder 22 through port 27.

Valve stem 31 extends through said chamber 48 and is operatively mounted in bearings 29a formed in the end walls of the valve casing 29. Each bearing is provided with a packing gland 52 to prevent escape of air therethrough.

A slide valve 54 is arranged in chamber 48 in sliding contact with the inner face 50a of plate 50 and alternately connects the outlet port 28 with chamber 48 and with exhaust port 51. This slide 54 is provided with a lateral and horizontal extension 55 having a semi-circular seat 55a for engaging the reduced portion 31a of stem 31. A coiled spring 56 is arranged in a bore formed in said extension and bears against said reduced portion 31a and maintains said slide under pressure in sealing contact with the ported face 50a. Said slide is actuated by a pair of spaced arms 57 connected to stem 31 and disposed to each side of portion 31a and extension 55a. These arms project laterally and engage the respective ends of said slide. Therefore, when stem 31 is actuated in either direction said arms 57 cause said slide to move accordingly.

A coiled spring 58 may be used to restore the stem 31 to normal or closed position and may be used to bring treadle 32 to normal position. A pressure regulator 60 is preferably interposed in connection 35 to regulate the pressure of the fluid admitted to the valve chamber and then to piston 22. This regulator can be adjusted so as to vary the degree of operating pressure applied by the cone members to the blank nipple or pipe sections so that greater or lesser degree of pressure can be applied in accordance with the size of the section to be tested.

To test a blank nipple or short section of pipe, said blank or section is placed in vertical position between cone members 16 and 37 with the lower end of the nipple or pipe section resting upon the apex of the stationary cone member and with the upper end of said nipple or cone section in alignment with the apex of the upper cone member. These cone members are adjusted so that there is a sufficient clearance between the upper end of the section to be tested and the apex of the cone member 16 when the latter occupies raised position. With the section in position, treadle 32 is now depressed, thereby raising stem 31 and moving slide valve 54 upwardly to open outlet port 28. The compressed air is now allowed to enter, through port 28 to connection 26 and cylinder 22. This pressure causes piston 24 to raise upwardly, thereby actuating piston rod 21 and lever 18. The movement of the long arm of this lever upwardly brings the short arm thereof downwardly, causing, through link 17, downward movement of plunger 15, thereby bringing the cone member 16 against the upper end of the section or nipple to be tested and subjecting such section to a predetermined degree of pressure. This pressure is thus applied to both ends of the nipple or pipe section through the cone-shaped members 16 and 37 and is so calculated that if the weld is imperfect the edges of the pipe are spread apart under the pressure. If, however, the joint is perfect the pressure has no effect upon the pipe or nipple. Thus the operator can readily separate the perfect nipples or sections from the distorted imperfect material.

After the testing operation, the treadle 32 is released and returns to normal position. This restores valve stem 31, causing downward movement of slide 54, thereby interrupting the communication between chamber 48 (into which opens air supply connection 35) and cylinder connection 26. At the same time inlet port 28 is connected by slide valve 54 with exhaust port 51, permitting the air to be exhausted from the cylinder, and lever 18 and parts associated therewith to be restored to normal position by spring 53.

The tubular section, being tested, is held under pressure between the cone members. As soon as the treadle 32 is released, cone member 16 moves away from the tubular section and permits the latter to be removed.

The testing operation does not require a skilled mechanic but can be done by unskilled labor in an efficient manner so that a large number of nipples or pipe sections can be tested quickly and in an economical manner.

Thus it will be seen that by the use of my testing apparatus scrap material, such as mill ends, heretofore considered waste and of no value, can be utilized in the manufacture of nipples by my novel method and also that the danger of injury to the pipe threading machine is reduced to a minimum as all the defective blank nipples or pipe sections are eliminated with my method. This eliminating step of imperfect material has not been heretofore practicable due to the lack of a suitable testing apparatus.

After the material has been tested in my improved apparatus, the blank nipple or short section of pipe is placed in a pipe threading machine for the threading operations. As all the imperfect material has been eliminated there is very little danger that the dies of the threading machine will bite into the imperfectly welded edge of the pipe and result in the jamming of the pipe threading machine and breakage of the die.

Therefore, by practicing my invention, I not only reduce the cost of raw material but fulcrumed on said support, connecting means between said lever and said movable cone member, a fluid pressure operated means for actuating said lever to move said movable cone member toward said stationary cone member, a spring connected to said lever for restoring said movable cone member to normal position, and a bracket on said support for supporting said stationary cone member, said bracket being adjustable on said support for varying the distance between said cone members.

In testimony whereof I hereunto affix my signature this 16th day of October, 1929.

JOHN M. READEY.